(No Model.)
S. A. BATES.
Elevator for Loading and Unloading Vessels.
No. 228,593. Patented June 8, 1880.
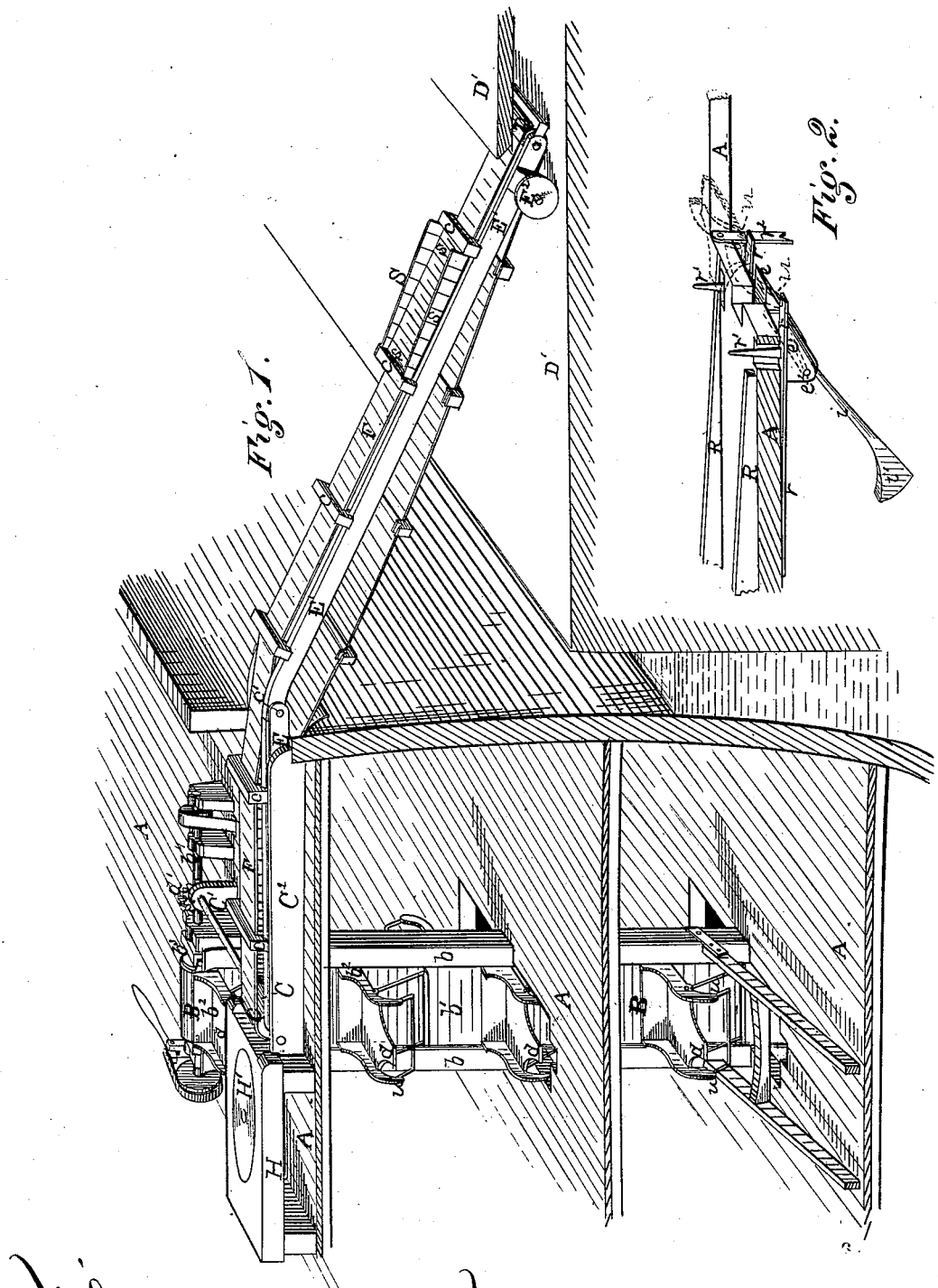
Witnesses.
C. L. Parker
R. H. Whittlesey
Inventor Samuel A. Bates,
By Attorney George H. Christy

UNITED STATES PATENT OFFICE.

SAMUEL A. BATES, OF PITTSBURG, PENNSYLVANIA, ASSIGNOR TO HIMSELF, J. J. McCORMICK, AND ROBERT LIDDELL, OF SAME PLACE.

ELEVATOR FOR LOADING AND UNLOADING VESSELS.

SPECIFICATION forming part of Letters Patent No. 228,593, dated June 8, 1880.

Application filed May 10, 1880. (No model.)

*To all whom it may concern:*

Be it known that I, SAMUEL A. BATES, of Pittsburg, county of Allegheny, State of Pennsylvania, have invented or discovered a new and useful Improvement in Elevators for Loading and Unloading Vessels; and I do hereby declare the following to be a full, clear, concise, and exact description thereof, reference being had to the accompanying drawings, making a part of this specification, in which like letters indicate like parts.

Figure 1 is a sectional perspective view illustrative of my improved elevator as adapted for use in loading or unloading vessels; and Fig. 2 is a perspective view, to an enlarged scale, of a detached portion of the device, illustrating certain improvements in the tripping and stop mechanism.

My present invention relates to certain improvements in that class of elevators for which Letters Patent of the United States were granted to me September 25, 1877, No. 195,475, and April 15, 1879, No. 214,233; and it consists in the combination, with an elevator of the class referred to, of a carrying-belt geared with or driven in proper relation to the elevator, and arranged and adapted to receive freight on the dock, and elevate or transport the same over the vessel's side to some definite point on deck, where it is discharged onto a turn-table properly arranged and adapted to receive packages from the dock-elevator and deliver the same in proper position into the ship's elevator, which is arranged to receive and deliver packages in the direction of the vessel's length. Also, certain improvements are made in the details of this apparatus, as hereinafter described.

In the drawings, A represents the decks of a vessel, in which is arranged one of my improved elevators, B, for raising or lowering packages, consisting of uprights $b\ b$, endless chain or belt $b'$, carrying-platforms $b^2$, attached to the face of the belt and adapted to receive and carry packages, and an upper and lower drum, $b^3$, over which the belt is driven by power-shaft $b^4$. These, with other details of construction, except as hereinafter provided, may be constructed and operated substan- tially as described in the patents above referred to.

In order to adapt such apparatus especially for use in loading and unloading vessels, I gear to shaft $b^4$, by bevel-gearing $d'$, or otherwise, a shaft and carrying-drum, C, journaled in any suitable bearings C', and to bed-timbers $C^2$. Between these bed-timbers I secure track strips or timber E, which extend from drum C, or near it, to and by preference a little over the side of the vessel, where their ends are jointed or hinged by any suitable flexible connection, as at $c'$, to the ends of similar track-timbers E', which extend over onto the dock D' far enough to be easily accessible. The end of this track resting on the dock is supported on a truck, $E^2$, which, in connection with the joint $c'$, enables the frame or track to adapt itself to the shifting position of the vessel or dock, or both, without interfering with the working of the apparatus. The end of the frame on deck, with the bed-timbers $C^2$, should be made fast in any convenient way, and may be permanently attached or made removable, as preferred. On this track-frame is carried an endless apron, belt, or chain, F, by passing over the drum C, and also over an idle drum, D, in the end of the frame on dock.

The upper edges of the rails E E' are made Λ-shaped to receive and guide notched strips or bearers $c$ in any desired number for properly supporting the belt on the track and to provide bearings for packages. This belt is driven by the rotation of drum C, as described, and its rate of motion may be regulated by the gearing $d'$ with reference to the carrying capacity of the elevator B.

If desired, bearing-rollers may be arranged under the belt at the joint $c'$; also, as the bearers $c$ pass the ship's edge strips may be arranged to receive the ends of the bearers and hold them up to prevent scratching on the edge or on deck. Packages of any suitable kind may be placed on this belt and moved by it either on or off shipboard over the vessel's side.

Between the delivery of belts F and B, I arrange a platform, H, in which is arranged a turn-table, H'. The position and relation of this turn-table is such that as packages are delivered over the drum C they will be received upon the table, by means of which an attendant can quickly and easily give such packages a quarter-turn, and thus bring them in proper position to be delivered directly onto one of the platforms $b^2$ of elevator B, or, vice versa, if engaged in unloading the platforms $b^2$, discharge their packages automatically onto the turn-table, on which they are turned, and then delivered directly onto the apron F.

The advantage of this apparatus is that it enables the ship to take or discharge freight from her side, and yet presents the package in proper manner to or from the elevator B, which, for several obvious reasons, is arranged to take and deliver its packages fore and aft, or in the direction of the vessel's length. Also, I raise the receiving-platform H to about the level of the delivery over C, and adjust the elevator B to receive and discharge its load at or about the same level.

When the ship has taken or discharged her cargo, as desired, the frame E E′, with belt F, may be taken on board, or the bed $C^2$, table H, track E E′, and belt F may be removed to the dock, to be used on another vessel; and in any case I prefer to secure these parts in place in such way, by bolts or otherwise, that they may readily be removed and put in position when desired.

When taking or discharging freight in bulk I make use of receptacles S, made of metallic strips $s$, which are arranged transversely across the belt, side by side, between the bearers $c$, and secured separately to the belt by rivets or otherwise. The ends of these strips are turned up somewhat, so that when combined, as shown, with each other and with the bearers $c$, they form a receptacle of extended surface, adapted to receive and carry a great variety of articles, and the division between plates $s$ enables the belt to turn freely over the drum C without interrupting the continuous motion of the belt.

The platforms $b^2$ of the elevator B are made self-discharging, as described in the patents above referred to, by the use of pivoted tilting plates or frames $d$, the projecting point of which engages a stop or trip arrangement at the desired point in the path of such projection. When the elevator is used for lowering packages this trip is not used, and in the construction heretofore shown it must be moved or turned out of the way by hand when the elevator is so used. To avoid this inconvenience I have devised an automatically-operating stop or trip, $e$, Fig. 2, which is so arranged as to tilt the plate $d$ by engaging its front projection when the platform is rising; but when descending the stop will, by slight pressure on its upper face, swing down and back sufficiently to let the plate $d$ pass without tripping. To this end I employ a wedge-shaped stop, $e$, which is pivoted under the deck A between two cheeks, $e'$, as at $e^2$. A bar, $i$, carrying a weight, $i'$, projects back from the pivot of the stop, and by a preponderance of weight holds the upper flat face of the stop against the under side of the deck or equivalent support. As the platforms ascend the projections $d$ strike or engage the under side of the stop $e$, and the plates are tipped to discharge the load, as before described; but as they descend the pressure of the projections $d$ bears down the stop, raising the weight $i$ and swinging the stop backward out of the path of $d$. As soon as the platform has passed the weight $i'$ again falls, carrying the stop to the position shown.

This automatic action enables the elevator to be operated in either direction without the inconvenience of first setting the trips or stops. These trips may be arranged to discharge the load of the elevator on the deck A, or on the platform H, as desired. In Fig. 2 I have shown it arranged to discharge onto the deck A, and in connection with it I have shown an improved device for preventing round packages from rolling from the skidway R onto the elevator except as required. This consists of two springs, $r\ r$, secured to the under side of the deck, and carrying horns or posts $r'$, which project up through the deck a sufficient distance to block the packages on the skid and prevent them from rolling down. The ends of these springs are continued toward the elevator such distance that the bent horns $u$ of the platform-frames may engage or bear against them, as in dotted lines, Fig. 2, and depress them as the platforms descend. Such depression will also depress the posts $r'$, and allow a package to roll down onto the elevator.

By properly adjusting the length of the springs they may be freed from the horns $u$ and return to the position shown in time to prevent the passage of more than one package.

When the platforms are raising the springs $r$ may be bent down out of the way of the horns $u$, and there secured or held by locks $r^2$ or otherwise. If desired, gearing may be added for driving the turn-table H′ from the shaft $b^4$, though ordinarily this will not be necessary.

By means of this apparatus vessels can be loaded or unloaded with great rapidity and economy, and therefore it is valuable help where large quantities of freight are to be handled.

I claim herein as my invention—

1. In an elevator for transferring packages from a dock to shipboard, or vice versa, the combination of a jointed or hinged track-frame, E E′, one part, E, being adapted to rest upon or be secured to the deck and the other part to rest its free end upon the dock, with truck $E^2$, carrying belt or chain F, drums C and D, and mechanism for giving to one of the drums rotary motion, substantially as set forth.

2. The combination track-rails E E′, drums C D, endless belt or chain F, bearers $c$, and strips $s$, having upturned ends, said strips being arranged across the belt side by side, and separately secured to the belt, substantially as and for the purposes set forth.

3. The combination of an endless-belt elevator arranged to take or discharge packages of freight from a vessel's side, an endless-belt elevator arranged on the vessel and adapted to take and discharge packages in the direction of the ship's length, and a turn-table located between the adjacent receiving and discharging points of such elevators, and adapted to receive a package from either elevator, and by a part turn to present the package in proper direction to the other elevator, substantially as set forth.

4. In combination with the tipping-plate $d$ of a self-discharging elevator-platform, a trip or stop, $e$, pivoted to the under side of its support A, and having a preponderance of weight on the side of its pivot away from the elevator, with a range of motion on its pivot into and out of the path of the tipping-plate, substantially as set forth.

5. The springs $r\ r$, having pins or upward-projecting horns $r'$ thereon, in combination with horns $u$ of the platform-frame deck A, and inclined skidway R, the same being arranged and operated substantially as described.

In testimony whereof I have hereunto set my hand.

SAMUEL A. BATES.

Witnesses:
C. L. PARKER,
R. H. WHITTLESEY.